US012667995B2

(12) United States Patent
Fu et al.

(10) Patent No.: US 12,667,995 B2
(45) Date of Patent: Jun. 30, 2026

(54) FLEXIBLE AND SMART WOOD WITH RESPONSIVE FUNCTION, PREPARATION METHOD THEREOF AND ACTUATOR

(71) Applicant: NANJING FORESTRY UNIVERSITY., Nanjing (CN)

(72) Inventors: Qiliang Fu, Nanjing (CN); Shuai Wu, Nanjing (CN); Yue Jiao, Nanjing (CN); Huashuo Ma, Nanjing (CN)

(73) Assignee: NANJING FORESTRY UNIVERSITY, Nanjing (CN)

( * ) Notice: Subject to any disclaimer, the term of this patent is extended or adjusted under 35 U.S.C. 154(b) by 206 days.

(21) Appl. No.: 18/419,652

(22) Filed: Jan. 23, 2024

(65) Prior Publication Data

US 2024/0383170 A1 Nov. 21, 2024

Related U.S. Application Data

(63) Continuation of application No. PCT/CN2023/095221, filed on May 19, 2023.

(30) Foreign Application Priority Data

May 15, 2023 (CN) ......................... 202310547353.2

(51) Int. Cl.

| | |
|---|---|
| ***B27N 1/00*** | (2006.01) |
| ***B27L 11/00*** | (2006.01) |
| ***B27N 3/02*** | (2006.01) |

(52) U.S. Cl.

CPC ................ *B27N 1/00* (2013.01); *B27L 11/00* (2013.01); *B27N 3/02* (2013.01)

(58) Field of Classification Search

CPC . B27K 3/343; B27K 3/38; B27K 3/42; B27K 3/08; B27N 1/00; B27N 3/02; B27L 11/00

See application file for complete search history.

(56) References Cited

U.S. PATENT DOCUMENTS 10,538,012 B2 * 1/2020 Boitouzet ................ C08H 8/00

FOREIGN PATENT DOCUMENTS

| | | | |
|---|---|---|---|
| CN | 109971009 | A | 7/2019 |
| CN | 110253702 | A | 9/2019 |
| CN | 113858368 | A | 12/2021 |
| JP | 2005161588 | A | 6/2005 |

* cited by examiner

*Primary Examiner* — Michael P Wieczorek

(74) *Attorney, Agent, or Firm* — Hemisphere Law, PLLC

(57) ABSTRACT

A flexible and smart wood with responsive function, an actuator and a preparation method of the flexible and smart wood with responsive function are provided. The preparation method includes the following steps: removing lignin from wood by using sodium chlorite solution, removing hemicellulose through alkali treatment, compounding a wood chip with an azobenzene compound by using a negative pressure method, and then densifying to form a wood film. According to the preparation method, the flexible and smart wood is successfully prepared, and the actuator made from the flexible and smart wood takes stimulation (such as illumination) given by an external environment as a power source, so that the actuator has an advantage of no secondary energy consumption.

5 Claims, 6 Drawing Sheets

FLEXIBLE AND SMART WOOD WITH RESPONSIVE FUNCTION, PREPARATION METHOD THEREOF AND ACTUATOR

TECHNICAL FIELD

The disclosure relates to the technical field of novel wood development, particularly to a flexible and smart wood with responsive function, an actuator and a preparation method of the flexible and smart wood with responsive function.

BACKGROUND

Wood is a kind of natural renewable material, and compared with a traditional metal material, the wood has characteristics of natural porous structure, high strength-to-weight ratio, environmental friendliness, etc. Moreover, high-efficiency and high-value utilization of the wood is always one of hot spots studied in the field of material science. Innovative research on the wood has gradually transformed from traditional basic research to advanced and multifunctional application research, which is a trend presented in recent years. Furthermore, development and utilization of advanced functions of the wood are always a leading edge innovative research of international interest, such as transparent wood, super wood, cooling wood, luminescent wood, and self-healing wood. A cell wall of the wood is mainly composed of cellulose, lignin, and hemicellulose, and compared with the lignin and the hemicellulose, the cellulose is distributed in a more regular shape and is served as a skeleton to support the wood. Natural honeycomb pores existed in the wood not only facilitate chemical substances entering into compositions of the cell wall to perform chemical reaction, but also facilitate filling of other modifiers. Based on the structure and composition characteristics of the wood described above, the natural porous structure of the wood is fully utilized, and the structural advantages of multi-level assembly of cell walls and directional arrangement of fibers are exerted. For example, the porous structure of the wood is filled with resin or is performed by densification compression, thereby constructing the transparent wood and the super wood. In addition, the wood can also have other functions such as magnetism, light emission, radiative cooling, energy storage, and wave absorption by means of chemical modification. In summary, the research and application of wood are gradually developed towards a high added value and an intelligent direction, thereby meeting diversified requirements of people on wood functional materials.

In order to further increase the added value and widen the application field of wood, the research of wood is gradually developed towards the intelligent field. Natural wood itself has a function of environmental regulation, for example, a house constructed by the wood has advantages of being warm in winter and cool in summer. Therefore, when the environment is too dry or humid, the wood can take advantage of its own compositions to regulate the humidity of the environment. In addition, after the wood is impacted, it can also be restored within a recovery range of elastic deformation. Inspired by self-adaptive adjustment characteristics of the natural wood, people can chemically modify the wood, so that the wood has smart response behaviors such as environmental perception and stimulation response. Smart functional wood materials such as self-healing wood, wood sponge, photochromic wood or wood-based nanogenerator, etc. are all developed from the wood as a raw material. However, the current development of smart wood materials mainly focuses on the electronic, photon, or hydrogen bonding smart response of the material itself. These wood-based smart materials have very limited changes in flexibility, which limits the application of wood-based smart materials in circumstances required for softness and flexibility, such as electronic skin, flexible actuator, and human tissue dressing. Therefore, there is an urgent need to develop a smart and environmentally friendly flexible material with an advanced smart responsive function.

SUMMARY

In view of the above, an objective of the disclosure is to provide a flexible and smart wood (i.e., flexible wood) with responsive function, an actuator and a preparation method of the flexible and smart wood with responsive function. When the flexible and smart wood provided by the disclosure is subjected to light stimulation, the flexible and smart wood can make response to external stimuli by means of changes in a shape of the flexible and smart wood, and then the flexible and smart wood can be applied to the field of smart flexible components.

In order to achieve the above object, the disclosure provides the following technical solution: a preparation method of a flexible and smart wood with responsive function, including the following steps:

- step 1, preparing acetic acid-sodium acetate buffer solution, and dissolving sodium chlorite in the acetic acid-sodium acetate buffer solution to obtain solution A;
- step 2, cutting wood into a wood chip, and soaking the wood chip in the solution A to perform a delignification treatment on the wood chip, thereby obtaining a lignin-removed wood chip;
- step 3, performing an alkali treatment on the lignin-removed wood chip obtained in the
- step 2 to remove hemicellulose contained in the wood chip, thereby obtaining an alkali-treated wood chip;
- step 4, impregnating an azobenzene compound into the alkali-treated wood chip by means of a negative pressure method to obtain an azobenzene-impregnated wood chip; and
- step 5, densifying the azobenzene-impregnated wood chip obtained in the step 4 into a wood film to obtain the flexible and smart wood with responsive function.

In an embodiment of the disclosure, in the step 1, a potential of hydrogen (pH) value of the acetic acid-sodium acetate buffer solution is 4.6, and a content of the sodium chlorite in the solution A is in a range of 1 wt % to 1.5 wt %.

In an embodiment of the disclosure, in the step 2, the wood is one selected from the group consisting of *Ochroma pyramidale, Populus simonii, Pinus, Betula platyphylla, Zelkova schneideriana, Quercus, Tilia tuan, Ulmus rubra, Mesua ferrea, Fraxinus mandshurica, Paulownia, Cinnamomum camphora, Hevea Brasiliensis, Xylosma congesta, Cupressus funebris*, and *Cunninghamia lanceolata*.

In an embodiment of the disclosure, in the step 2, the delignification treatment includes: soaking the wood chip cut from the wood in the solution A, then stirring the solution A soaked with the wood chip at a speed of 500 revolutions per minute (r/min), and then heating the solution A soaked with the wood chip to a temperature of 80 degrees Celsius (° C.) to stew for 6 hours (h).

According to the disclosure, in the step 3, the alkali treatment includes: placing the lignin-removed wood chip in sodium hydroxide (NaOH) solution with a mass fraction of 4%, and then soaking the lignin-removed wood chip in the NaOH solution for 3-6 h.

In an embodiment of the disclosure, in the step 4, the azobenzene compound is one selected from the group consisting of azobenzene ($C_{12}H_{10}N_2$), azoxybenzene ($C_{12}H_{10}N_2O$), p-aminoazobenzene ($C_{12}H_{11}N_3$), 4-methoxyazobenzene ($C_{13}H_{12}N_2O$), azobenzene-3,3'-dicarboxylic acid ($C_{14}H_{10}N_2O_4$), azobenzene-4,4'-dicarboxylic acid ($C_{14}H_{10}N_2O_4$), 4-aminoazobenzene-4'-sulfonic acid sodium salt ($C_{12}H_{10}N_3NaO_3S$), 3,3'-dimethylazobenzene ($C_{14}H_{14}N_2$), 4-phenylan azobenzene compoundulfonyl chloride ($C_{12}H_9ClN_2O_2S$), 4-dimethylamino-2-methylazobenzene ($C_{15}H_{17}N_3$), 4-nitroazobenzene ($C_{12}H_9N_3O_2$), 4-phenylazobenzoyl chloride ($C_{13}H_9ClN_2O$), 4,4'-diaminoazobenzene ($C_{12}H_{12}N_4$), 4'-chloro-4-dimethylaminoazobenzene ($C_{14}H_{14}ClN_3$), 4-carboxyl-2-aminoazobenzene, azobenzene-4,4'-dicarboxylic acid dimethyl ester ($C_{16}H_{14}N_2O_4$), 2,2'-dihydroxyazobenzene ($C_{12}H_{10}N_2O_2$), 4-phenyldiazenylaniline hydrochloride ($C_{12}H_{12}ClN_3$), 4-(methylamino)azobenzene ($C_{13}H_{13}N_3$), 4-benzyloxyazobenzene, 2'-chloro-4-dimethylaminoazobenzene ($C_{14}H_{14}ClN_3$), 4,4'-azodibenzoyl dichloride ($C_{14}H_8Cl_2N_2O_2$), sodium 4-hydroxyazobenzene-4'-sulfonate hydrate ($C_{12}H_9N_2NaO_4S$), 3'-chloro-4-dimethylaminoazobenzene ($C_{14}H_{14}ClN_3$), 4,4'-di-n-amyloxyazoxybenzene ($C_{22}H_{30}N_2O_3$), 4'-iodo-4-dimethylaminoazobenzene ($C_{14}H_{14}IN_3$), 4-dimethylamino-2-methylazobenzene ($C_{15}H_{17}N_3$), 4-dimethylaminoazobenzene-4'-carboxylic acid ($C_{15}H_{15}N_3O_2$), 4,4'-bis(maleoylamino)azobenzene ($C_{20}H_{12}N_4O_4$), 4,4'-dinonyloxyazoxybenzene ($C_{30}H_{46}N_2O_3$), 4,4'-bis(hexyloxy)-3-methylazobenzene ($C_{25}H_{36}N_2O_2$), 4,4'-bis(decyloxy)-3-methylazobenzene ($C_{33}H_{52}N_2O_2$), 4-hydroxy-azobenzene-4'-carboxylicacid ($C_{13}H_{10}N_2O_3$), diethyl azoxybenzene-4,4'-dicarboxylate ($C_{18}H_{18}N_2O_5$), 4-acetamido-2',3-dimethylazobenzene ($C_{16}H_{17}N_3O$), 4-(4-hydroxy-phenylazo)benzoic acid ethyl ester ($C_{15}H_{14}N_2O_3$), 2-amino-5-((4-sulfophenyl)azo)-benzene sulfonicacidisodium salt ($C_{12}H_9N_3Na_2O_6S_2$), 4,4'-di-n-dodecyloxyazoxybenzene ($C_{36}H_{58}N_2O_3$), 4,4'-bis(dodecyloxy)-3-methylazobenzene ($C_{37}H_{60}N_2O_2$), 4-dimethylaminoazobenzene-4-sulfonyl chloride ($C_{14}H_{14}ClN_3O_2S$), 2,4-hexadiyne-1,6-diol bis(azobenzene-4-sulfonate) ($C_{30}H_{26}N_4O_6S_2$), 4-(4-isothiocyanatophenylazo)-N,N-dimethylaniline ($C_{15}H_{14}N_4S$), 4-[bis(9,9-dimethylfluoren-2-yl)amino]azobenzene ($C_{42}H_{35}N_3$), dabsyl-l-leucine ($C_{20}H_{26}N_4O_4S$), 5-sulfo-4'-diethylamino-2,2'-dihydroxyazobenzene ($C_{16}H_{19}N_3O_5S$), N,N-diethyl-4-phenyldiazenylaniline ($C_{16}H_{19}N_3$), 4-hydroxy-4'-dimethylaminoazobenzene ($C_{14}H_{15}N_3O$), 4,4'-di-n-octyloxyazoxybenzene ($C_{28}H_{42}N_2O_3$), 4-amino-2',3-dimethylazobenzene hydrochloride ($C_{14}H_{16}ClN_3$), 4-(dimethylamino)azobenzene ($C_{14}H_{15}N_3$), 2-methyl-5-(p-tolyldiazenyl)aniline ($C_{14}H_{15}N_3$), 4-(phenylazo)benzoic acid ($C_{13}H_{10}N_2O_2$), 4,4'-azoxydianisole ($C_{14}H_{14}N_2O_3$), 4-(4-bromophenylazo)phenol ($C_{12}H_9BrN_2O$), 4-(4-nitrophenylazo)phenol ($C_{12}H_9N_3O_3$), 3-[[4-(dimethylamino)phenyl]diazenyl]benzoic acid ($C_{15}H_{15}N_3O_2$), dabsyl-l-alanine ($C_{17}H_{20}N_4O_4S$), 4-(4-butylphenylazo)phenol ($C_{16}H_{18}N_2O$), 4-(dimethylamino)azobenzene ($C_{14}H_{15}N_3$), methyl red hydrochloride ($C_{15}H_{16}ClN_3O_2$), sudan orange G ($C_{12}H_{10}N_2O_2$), diethyl 4,4'-azodibenzoate ($C_{18}H_{18}N_2O_4$), sodium 2-[4-(dimethylamino)phenylazo]benzoate ($C_{15}H_{14}N_3NaO_2$), 4-[4-(dimethylamino)phenylazo]benzoic acid N-succinimidyl ester ($C_{19}H_{18}N_4O_4$), and oxalazine sodium ($C_{14}H_8N_2Na_2O_6$).

According to the disclosure, in the step 4, the negative pressure method includes: immersing the alkali-treated wood chip in a container filled with solution of the azobenzene compound, and then performing a negative pressure treatment on the alkali-treated wood chip for 1 h at a negative pressure of −0.1 megapascals (MPa) to −0.08 MPa.

The disclosure further provides a flexible and smart wood with responsive function prepared by the preparation method according to the above technical solution.

The disclosure further provides a smart responsive flexible wooden actuator (i.e., actuator), which is obtained by cutting the flexible and smart wood.

Beneficial technical effects of the disclosure are as follows. The disclosure provides the flexible and smart wood with responsive function, the actuator and the preparation method of the flexible and smart wood with responsive function. The preparation method provided by the disclosure includes: removing the lignin contained in the wood by using the sodium chlorite solution, removing the hemicellulose by means of the alkali treatment, using the negative pressure method to compound the wood chip with the azobenzene compound, and then performing densification treatment to obtain the wood film. The disclosure uses the wood as main raw material and the wood is a natural green renewable material; when stimulated by the light, the smart responsive flexible wooden actuator can make response by means of shape changes; and the smart responsive flexible wooden actuator can not only apply the wood to the field of smart flexible components, but also can be applied in the field of wireless drive robots without batteries, cables, or electronic components. In summary, features of the flexible and smart wood such as flexibility, intelligence, responsiveness, etc., meet the requirements of lightweight, miniaturization, controllability of the micro-robots, as well as the requirements of the smart functional materials in application scenarios.

DETAILED DESCRIPTION OF EMBODIMENTS

Figure 1:
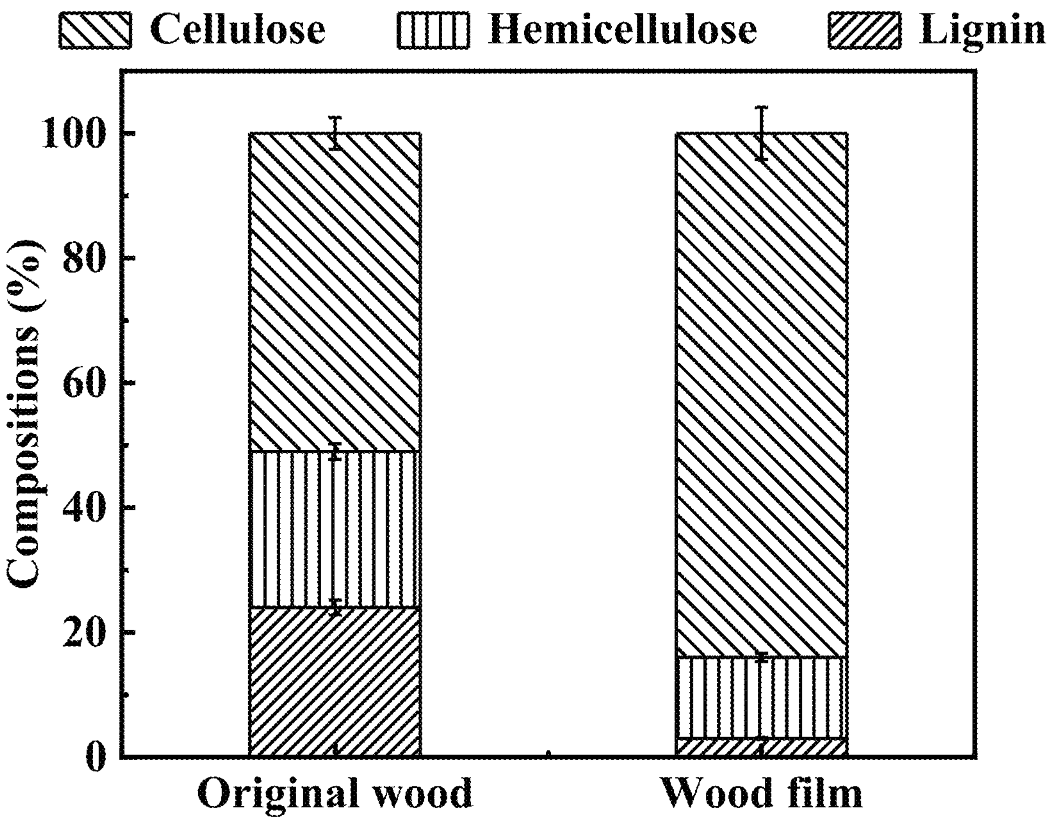
FIG. 1 illustrates a schematic diagram of composition analysis of a flexible and smart wood prepared in an embodiment 1.

The disclosure provides a preparation method of a flexible and smart wood with responsive function, including the following steps:

step 1, weighing sodium acetate and acetic acid, then adding the sodium acetate and the acetic acid into deionized water by stirring uniformly to prepare acetic acid-sodium acetate buffer solution with a potential of hydrogen (pH) value being 4.6; weighing sodium chlorite to dissolve in the acetic acid-sodium acetate buffer solution to obtain solution A, a content of the sodium chlorite in the solution A being a range of 1-1.5 wt %;

step 2, cutting wood into a wood chip with a size of 20×50×0.8 cubic millimeters ($mm^3$), soaking the wood chip in the solution A, and then stirring the solution A soaked with the wood chip at a speed of 500 revolutions per minute (r/min) and a temperature of 80 degrees Celsius (° C.) for 6 hours (h), for a purpose of removing lignin contained in the wood chip, thereby obtaining a lignin-removed wood chip;

step 3, placing the lignin-removed wood chip obtained in the step 2 in deionized water for cleaning to obtain a cleaned lignin-removed wood chip, preparing sodium hydroxide (NaOH) solution with a mass fraction of 4% in a container, and then placing the cleaned lignin-removed wood chip into the container loaded with the NaOH solution with the mass fraction of 4%, thereafter placing the container in a vacuum drying oven with negative pressure for 30 minutes (min), and then performing an alkali treatment on the cleaned lignin-removed wood chip in the NaOH solution for 3-6 h until the wood chip therein is softened;

step 4, first cleaning the softened wood chip with deionized water, then placing the softened wood chip after being cleaned in acetone solution for second cleaning, the above cleaning processes being completed in a vacuum drying oven with a negative pressure of −0.1 megapascals (MPa), each time of the cleaning processes being performed for 20 min, dissolving an azobenzene compound in N,N-dimethylformamide with a structural formula of $C_3H_7NO$ (DMF with analytical reagent abbreviated as AR being 99.5%) solution, and then placing the wood chip after being cleaned by the acetone solution in the DMF solution containing the azobenzene compound, and placing the DMF solution loaded with the wood chip together into a vacuum drying oven to be subjected to a negative pressure treatment at a range of −0.1 MPa to −0.08 MPa for 1 h, for a purpose of impregnating the azobenzene compound into pores of the wood chip; and step 5, taking out the wood chip impregnated with the azobenzene compound, washing an azobenzene compound and residual DMF solution on a surface of the wood chip by using deionized water, then placing the wood chip on a middle of a steel plate paved with a poly (ethylene glycol succinate) (PES) film, and exerting 6-10 kilograms (kg) of weights on the steel plate to compress the wood chip, thereby compressing the wood chip into a wood film, and the compressed wood chip (i.e., the wood film) having a thickness of about 45-70 micrometers (m) and being present in a translucent state.

The disclosure further provides a flexible and smart wood with responsive function prepared by the preparation method according to the above technical solution.

The disclosure further provides a smart responsive flexible wooden actuator, which is obtained by cutting the flexible and smart wood. Specifically, the wood chip is cut by taking shapes of insects such as butterfly and luxury as templates to obtain a wood chip with a special shape. Additionally, an end of the wood chip is fixed, and then the wood chip is used to serve as a lifting device. Irradiated by ultraviolet light, the designed wood chip (i.e., the wood chip with the special shape) can make response to change into the smart responsive flexible wooden actuator.

In order to better understand the disclosure, the following embodiments further illustrate the contents of the disclosure, but the contents of the disclosure are not limited to the following embodiments.

Embodiment 1

Step 1, 4 grams (g) of sodium acetate and 18 g of acetic acid are weighed, and then are added into 3 litters (L) of deionized water accompanied with stirring uniformly to prepare acetic acid-sodium acetate buffer solution with a pH value of 4.6; and 6 g of sodium chlorite is weighed and then is dissolved in 594 g of the acetic acid-sodium acetate buffer solution to obtain solution A.

Step 2, *Ochroma pyramidale* is cut into a wood chip with a size of 20×50×0.8 $mm^3$, and then the wood chip is soaked in the solution A accompanied with stirring at 500 r/min and a temperature of 80° C. for 6 h.

Step 3, the wood chip is taken out and then is placed in deionized water for cleaning, NaOH solution is prepared with a mass fraction of 4% in a container, the cleaned wood chip is placed into the container loaded with the NaOH solution with the mass fraction of 4%, then the container is placed in a vacuum drying oven with negative pressure treatment for 30 min, and an alkali treatment is performed on the wood chip in the NaOH solution for 6 h until the wood chip is softened.

Step 4, the softened wood chip is cleaned twice with deionized water, and then the cleaned softened wood chip is placed in 20 milliliters (ml) of acetone solution to be cleaned twice again, the above cleaning processes are all completed in a vacuum drying oven with a pressure of −0.1 MPa, and each time of the cleaning processes is 20 min; azobenzene is dissolved in DMF solution (with AR being 99.5%), and then the wood chip after being cleaned by the acetone solution is placed in the DMF solution containing the azobenzene, and then the wood chip together with the DMF solution containing the azobenzene is placed into a vacuum drying oven to be subjected to a negative pressure treatment at −0.1 MPa for 1 h.

Step 5, the wood chip impregnated with the azobenzene is taken out to wash the azobenzene and residual DMF solution on a surface of the wood chip by using deionized water; and then the wood chip is placed on a middle of a steel plate paved with a PES film, 10 kg of weights are exerted on steel plate to compress the wood chip, thereby compressing the wood chip into a wood film; and the compressed wood chip has a thickness of about 45 m and is present in a translucent state.

From the composition analysis of the original wood and the prepared flexible and smart wood, it can be seen from FIG. 1 that compared with the original wood, after being treated with acid buffer solution and alkali, the content of lignin and hemicellulose in the original wood is significantly reduced. Namely, the content of lignin and hemicellulose covers 50% of a total amount of the original wood, and then is reduced to less than 20%. The above is also a reason why the prepared flexible and smart wood with the responsive function has flexibility, i.e., the hard portion of the original wood has been mostly removed.

Figure 2:
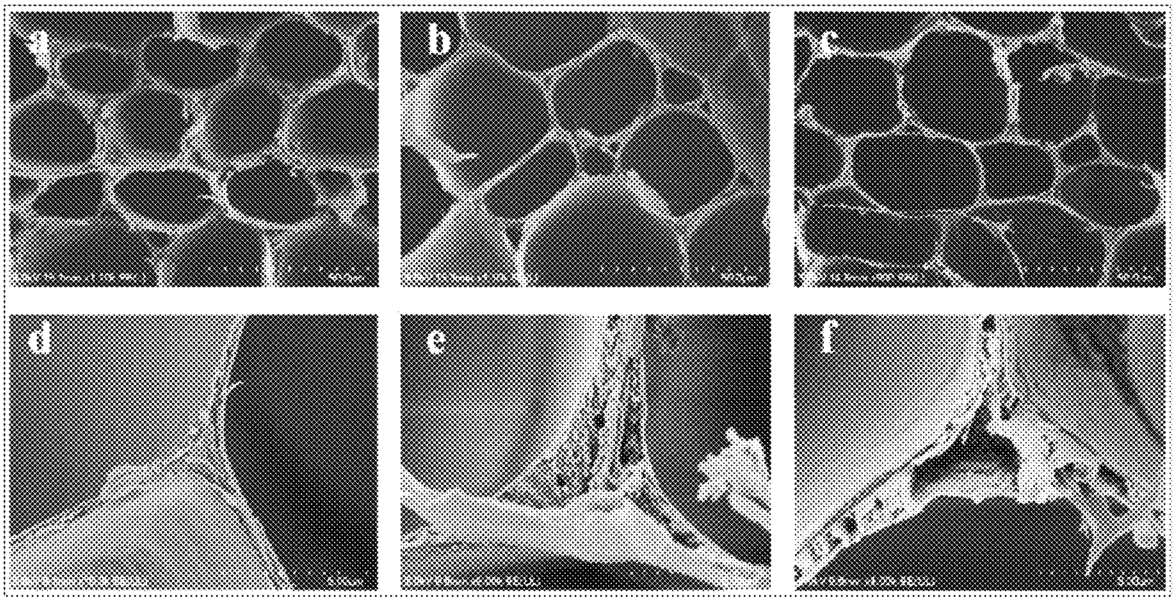
FIG. 2 illustrates a schematic diagram of micro morphologies of an original wood chip, a lignin-removed wood chip, and an alkali-treated wood chip according to the embodiment 1.

Micro morphologies of the original wood chip, the lignin-removed wood chip, and the alkali-treated wood chip are characterized, which illustrates in FIG. 2. Specially, in FIG.

2, (a) and (d) illustrate the micro-morphology diagrams of the original wood chip, (b) and (e) illustrate the micro-morphology diagrams of the lignin-removed wood chip, (c) and (f) illustrate the micro-morphology diagrams of the alkali-treated wood chip. It can be seen from FIG. 2 that a cell wall of the wood chip is gradually thinned because the lignin and hemicellulose in the cell wall are removed. Moreover, after continued amplification, as shown in (d), (e), and (f), an inter-cell angle changes from dense to loose porous, which is consistent with the conclusion expressed by the composition analysis of FIG. 1.

Figure 3:
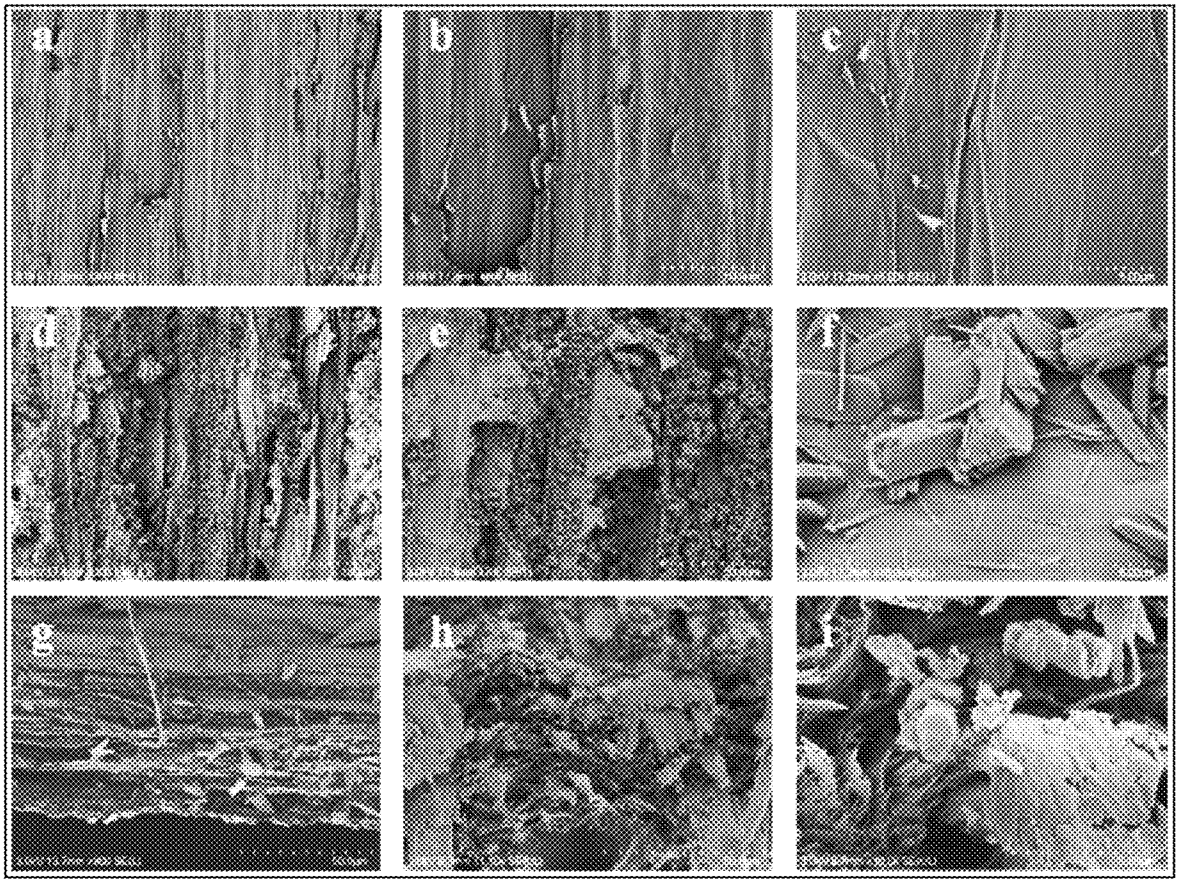
FIG. 3 illustrates a schematic diagram of surface micro morphologies and cross-sectional views of an original wood film and an Azo-wood film according to the embodiment 1.

As shown in FIG. 3, surface micro morphologies of wood films impregnated with the azobenzene compound are characterized. Specially, in FIG. 3, (a) to (c) illustrate the surface micro-morphology diagrams of the original wood film; (d) to (f) illustrate the surface micro-morphology diagrams of the wood film impregnated with the azobenzene compound; (g) illustrates a cross section of the original wood film; and (h) and (i) illustrate cross sections of the wood film impregnated with the azobenzene compound. It can be seen from FIG. 3 that the surface of the original wood film is very smooth, whereas granular azobenzene compound is disposed on the surface as illustrated in (d), (e), and (f). Moreover, (g) illustrates the cross section of the original wood film, and it can be seen that (h) and (i) lack the azobenzene compound between the layered cellulose, thus it can be seen that the azobenzene compound have been supported on the surface of the wood film.

Figure 4A:
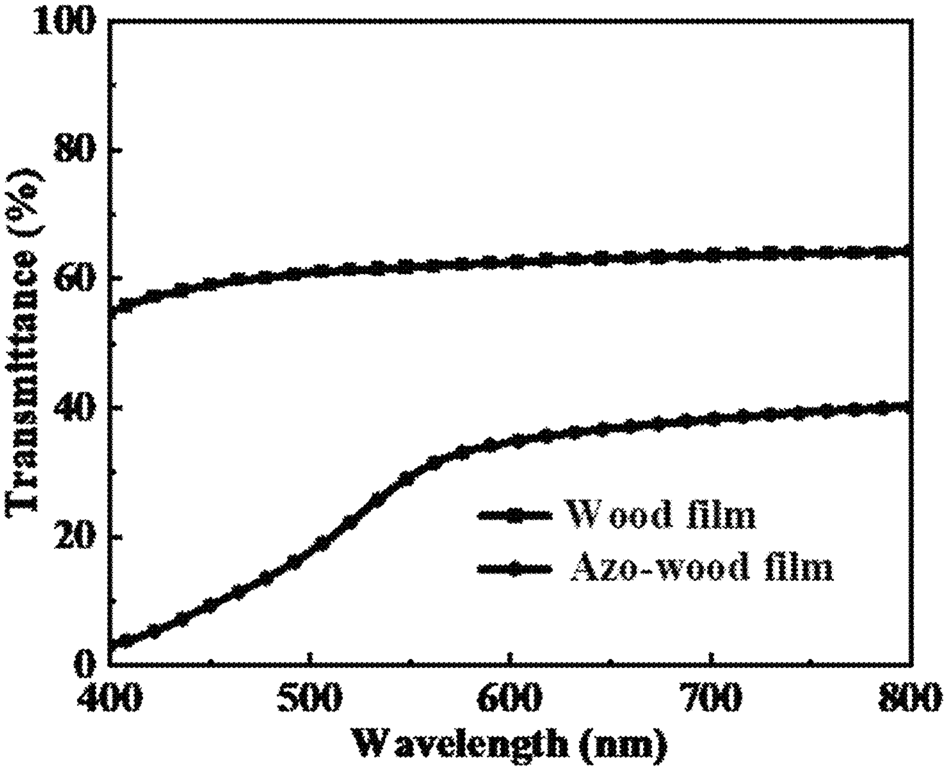
FIG. 4A illustrates a schematic diagram of transmittance of the original wood film and the Azo-wood film according to the embodiment 1.
Figure 4B:
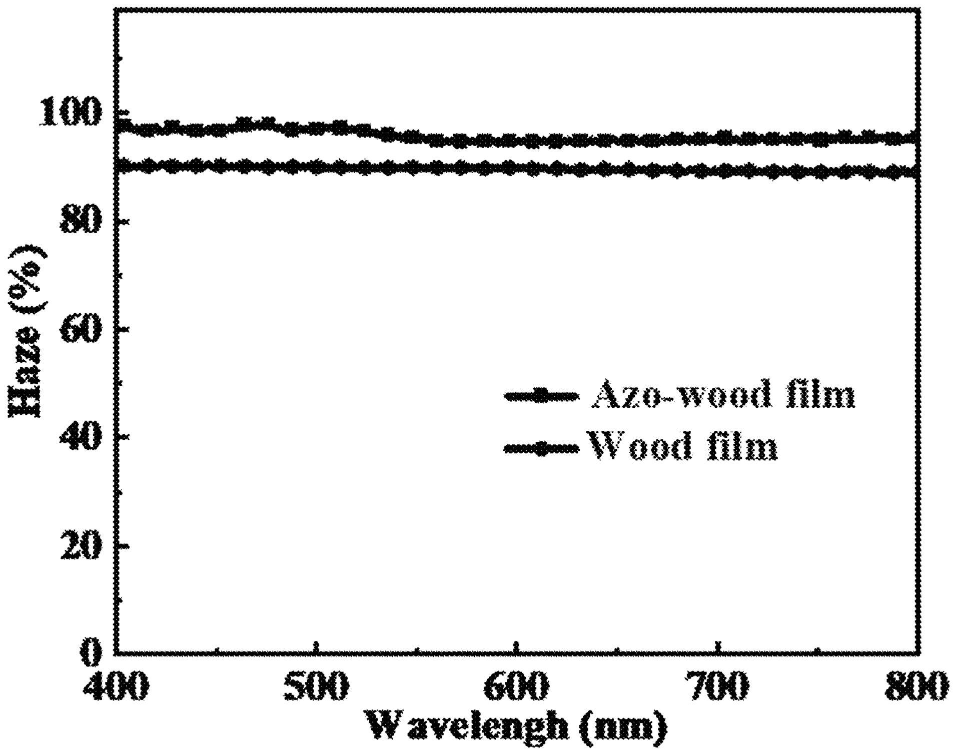
FIG. 4B illustrates a schematic diagram of haze of the original wood film and the Azo-wood film according to the embodiment 1.

The transmittance and haze of the original wood film and the wood film impregnated with the azobenzene compound (also referred to as Azo-wood film) are tested. As shown in FIGS. 4A-4B, FIG. 4A illustrates a diagram of the transmittance, and FIG. 4B illustrates a diagram of the haze. FIG. 4A illustrates that the addition of azobenzene compound reduces the transmittance of the original wood film by about 30% and the decrease in transmittance affects the photoresponse speed. FIG. 4B illustrates that there are almost few differences between the original wood film and the Azo-wood film in view of haze. Therefore, the influence of azobenzene compound on the haze of the wood film can be ignored.

Embodiment 2

Step 1, 4 grams (g) of sodium acetate and 18 g of acetic acid are weighed, and then are added into 3 litters (L) of deionized water accompanied with stirring uniformly to prepare acetic acid-sodium acetate buffer solution with a pH value of 4.6; and 6 g of sodium chlorite is weighed and then is dissolved in 594 g of the acetic acid-sodium acetate buffer solution to obtain solution A.

Step 2, *Populus simonii* is cut into a wood chip with a size of 20×50×0.8 $mm^3$, and then the wood chip is soaked in the solution A accompanied with stirring at 500 r/min and a temperature of 80° C. for 6 h.

Step 3, the wood chip is taken out and then is placed in deionized water for cleaning, NaOH solution is prepared with a mass fraction of 4% in a container, the cleaned wood chip is placed into the container loaded with the NaOH solution with the mass fraction of 4%, then the container is placed in a vacuum drying oven with negative pressure treatment for 30 min, and an alkali treatment is performed on the wood chip in the NaOH solution for 5 h until the wood chip is softened.

Step 4, the softened wood chip is cleaned twice with deionized water, and then the cleaned softened wood chip is placed in 20 ml of acetone solution to be cleaned twice again, the above cleaning processes are all completed in a vacuum drying oven with a pressure of −0.1 MPa, and each time of the cleaning processes is 20 min; azoxybenzene is dissolved in DMF solution (with AR being 99.5%), and then the wood chip after being cleaned by the acetone solution is placed in the DMF solution containing the azoxybenzene, and then the wood chip together with the DMF solution containing the azoxybenzene is placed into a vacuum drying oven to be subjected to a negative pressure treatment at −0.1 MPa for 1 h.

Step 5, the wood chip impregnated with the azoxybenzene is taken out to wash the azoxybenzene and residual DMF solution on a surface of the wood chip by using deionized water; and then the wood chip is placed on a middle of a steel plate paved with a PES film, 10 kg of weights are exerted on steel plate to compress the wood chip, thereby compressing the wood chip into a wood film; and the compressed wood chip has a thickness of about 50 m and is present in a translucent state.

Embodiment 3

Step 1, 4 grams (g) of sodium acetate and 18 g of acetic acid are weighed, and then are added into 3 litters (L) of deionized water accompanied with stirring uniformly to prepare acetic acid-sodium acetate buffer solution with a pH value of 4.6; and 6 g of sodium chlorite is weighed and then is dissolved in 594 g of the acetic acid-sodium acetate buffer solution to obtain solution A.

Step 2, *Pinus* is cut into a wood chip with a size of 20×50×0.8 $mm^3$, and then the wood chip is soaked in the solution A accompanied with stirring at 500 r/min and a temperature of 80° C. for 6 h.

Step 3, the wood chip is taken out and then is placed in deionized water for cleaning, NaOH solution is prepared with a mass fraction of 4% in a container, the cleaned wood chip is placed into the container loaded with the NaOH solution with the mass fraction of 4%, then the container is placed in a vacuum drying oven with negative pressure treatment for 30 min, and an alkali treatment is performed on the wood chip in the NaOH solution for 5 h until the wood chip is softened.

Step 4, the softened wood chip is cleaned twice with deionized water, and then the cleaned softened wood chip is placed in 20 ml of acetone solution to be cleaned twice again, the above cleaning processes are all completed in a vacuum drying oven with a pressure of −0.1 MPa, and each time of the cleaning processes is 20 min; p-aminoazobenzene is dissolved in DMF solution (with AR being 99.5%), and then the wood chip after being cleaned by the acetone solution is placed in the DMF solution containing the p-aminoazobenzene, and then the wood chip together with the DMF solution containing the p-aminoazobenzene is placed into a vacuum drying oven to be subjected to a negative pressure treatment at −0.1 MPa for 1 h.

Step 5, the wood chip impregnated with the p-aminoazobenzene is taken out to wash the p-aminoazobenzene and residual DMF solution on a surface of the wood chip by using deionized water; and then the wood chip is placed on a middle of a steel plate paved with a PES film, 10 kg of weights are exerted on steel plate to compress the wood chip, thereby compressing the wood chip into a wood film; and the compressed wood chip has a thickness of about 48 m and is present in a translucent state.

Embodiment 4

Step 1, 4 grams (g) of sodium acetate and 18 g of acetic acid are weighed, and then are added into 3 litters (L) of deionized water accompanied with stirring uniformly to prepare acetic acid-sodium acetate buffer solution with a pH value of 4.6; and 6 g of sodium chlorite is weighed and then is dissolved in 594 g of the acetic acid-sodium acetate buffer solution to obtain solution A.

Step 2, *Betula platyphylla* is cut into a wood chip with a size of 20×50×0.8 $mm^3$, and then the wood chip is soaked in the solution A accompanied with stirring at 500 r/min and a temperature of 80° C. for 6 h.

Step 3, the wood chip is taken out and then is placed in deionized water for cleaning, NaOH solution is prepared with a mass fraction of 4% in a container, the cleaned wood chip is placed into the container loaded with the NaOH solution with the mass fraction of 4%, then the container is placed in a vacuum drying oven with negative pressure treatment for 30 min, and an alkali treatment is performed on the wood chip in the NaOH solution for 4 h until the wood chip is softened.

Step 4, the softened wood chip is cleaned twice with deionized water, and then the cleaned softened wood chip is placed in 20 ml of acetone solution to be cleaned twice again, the above cleaning processes are all completed in a vacuum drying oven with a pressure of −0.1 MPa, and each time of the cleaning processes is 20 min; p-aminoazobenzene is dissolved in DMF solution (with AR being 99.5%), and then the wood chip after being cleaned by the acetone solution is placed in the DMF solution containing the p-aminoazobenzene, and then the wood chip together with the DMF solution containing the p-aminoazobenzene is placed into a vacuum drying oven to be subjected to a negative pressure treatment at −0.1 MPa for 1 h.

Step 5, the wood chip impregnated with the p-aminoazobenzene is taken out to wash the p-aminoazobenzene and residual DMF solution on a surface of the wood chip by using deionized water; and then the wood chip is placed on a middle of a steel plate paved with a PES film, 10 kg of weights are exerted on steel plate to compress the wood chip, thereby compressing the wood chip into a wood film; and the compressed wood chip has a thickness of about 55 μm and is present in a translucent state.

Embodiment 5

A difference between the embodiment 4 and the present embodiment lies in replacing the p-aminoazobenzene with 4-methoxyazobenzene. The compressed wood chip has a thickness of about 52 m and is present in a translucent state.

Embodiment 6

A difference between the embodiment 4 and the present embodiment lies in replacing the p-aminoazobenzene with azobenzene-3,3'-dicarboxylic acid. The compressed wood chip has a thickness of about 47 m and is present in a translucent state.

Test Example

Figure 5:
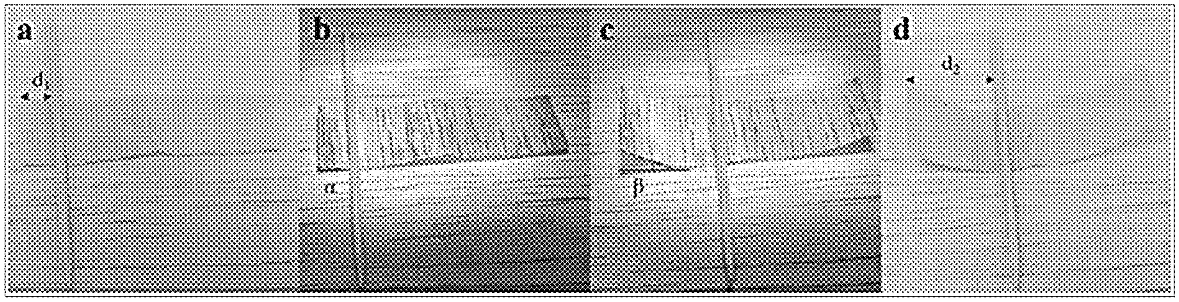
FIG. 5 illustrates a schematic diagram of test effects of the flexible and smart wood obtained in the embodiment 1 lifting a toothpick in a case of photoresponse.

The flexible and smart wood obtained from the embodiment 1 is tested for its effectiveness by lifting a toothpick under photoresponse. It can be seen from FIG. 5 that a weight (i.e., a toothpick) is placed at an end of the flexible and smart wood, with a distance of d1 from a boundary of the flexible and smart wood. Irradiated by the ultraviolet light, the flexible and smart wood makes response by lifting the end placed the weight and pushing the weight to move to a right end, and meanwhile, a distance from the boundary of the flexible and smart wood is measured as d2. As seen from FIG. 5, d2 is greater than d1. Moreover, an angle between the end of the flexible and smart wood and a plane before and after illumination is also different, i.e., $\beta > \alpha$.

Embodiment 7

Figure 6:
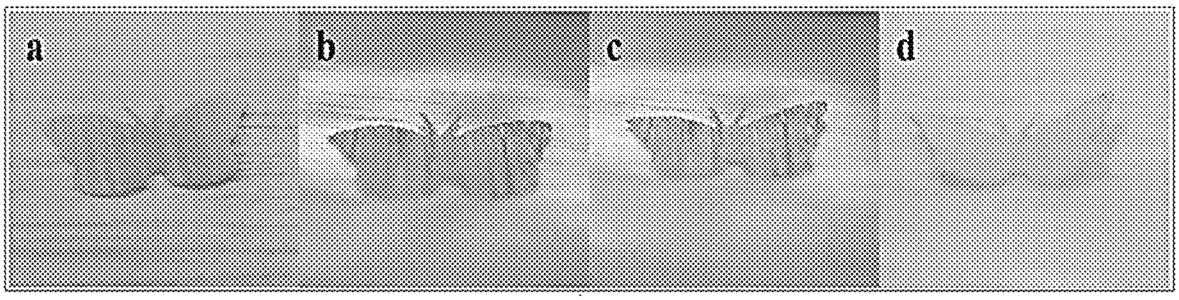
FIG. 6 illustrates a schematic diagram of photoresponse effects of a butterfly-shaped smart responsive flexible wooden actuator.

The flexible and smart wood obtained in the embodiment 1 is cut by taking a shape of butterfly as a template to obtain the wooden actuator with a special shape, and photoresponse effect test of the wooden actuator is shown in FIG. 6. Irradiated by the ultraviolet light, wings of the wooden actuator flaps, and position changes of the wings can be seen from FIG. 6.

Embodiment 8

Figure 7:
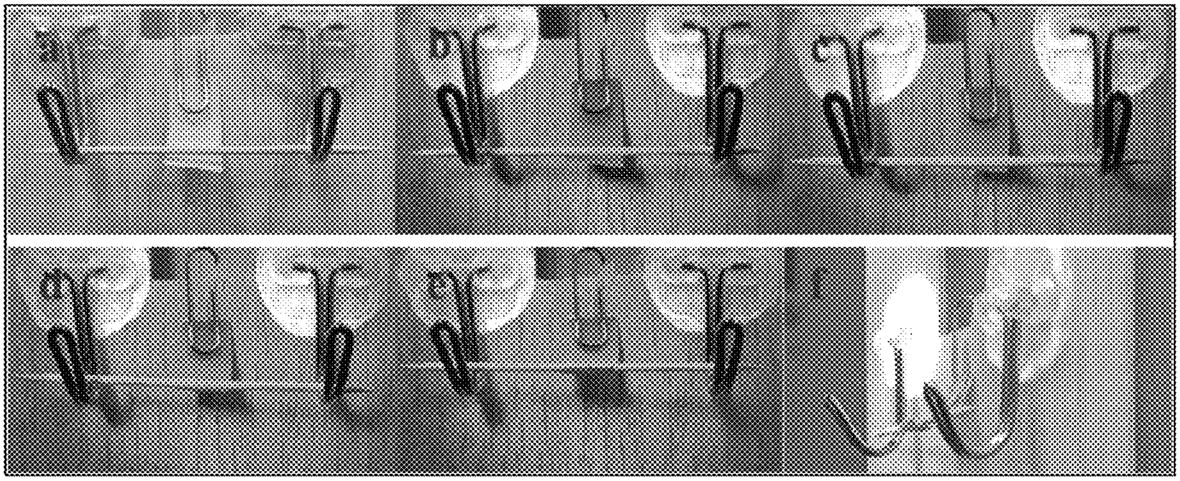
FIG. 7 illustrates a schematic diagram of effects of a smart responsive flexible wooden actuator used as a lifting device.

An end of the flexible and smart wood obtained in the embodiment 1 is fixed, and then the flexible and smart wood is used as a lifting device, thereby obtaining a wooden actuator; and then an effect test is performed on the wooden actuator. It can be seen from FIG. 7 that the flexible and smart wood after being irradiated by ultraviolet light can make response, then to lift the placed toothpick. Therefore, the flexible and smart wood can be used as the lifting device without wires and other connections.

The above description is only the illustrated implementation mode, and it should be noted that, for those skilled in the related art, several improvements and modifications can be made without departing from the principle of the disclosure, and these improvements and modifications should also be regarded as the protection of the scope of the disclosure.

What is claimed is:

1. A preparation method of a flexible wood with responsive function, comprising the following steps:

step 1, preparing acetic acid-sodium acetate buffer solution, and dissolving sodium chlorite in the acetic acid-sodium acetate buffer solution to obtain solution A;

step 2, cutting wood into a wood chip, and soaking the wood chip in the solution A to perform a delignification treatment on the wood chip, thereby obtaining a lignin-removed wood chip;

step 3, performing an alkali treatment on the lignin-removed wood chip obtained in the step 2 to remove hemicellulose contained in the wood chip, thereby obtaining an alkali-treated wood chip;

step 4, impregnating an azobenzene compound into the alkali-treated wood chip by means of a negative pressure method to obtain an azobenzene-impregnated wood chip; and step 5, densifying the azobenzene-impregnated wood chip obtained in the step 4 into a wood film to obtain the flexible wood with responsive function;

wherein in the step 3, the alkali treatment comprises: placing the lignin-removed wood chip in sodium hydroxide (NaOH) solution with a mass fraction of 4%, and then soaking the lignin-removed wood chip in the NaOH solution for 3-6 hours (h); and wherein in the step 4, the negative pressure method comprises: immersing the alkali-treated wood chip in a container filled with solution of the azobenzene compound, and then performing a negative pressure treatment on the alkali-treated wood chip for 1 h at a negative pressure of −0.1 megapascals (MPa) to −0.08 MPa.

2. The preparation method according to claim 1, wherein in the step 1, a potential of hydrogen (pH) value of the acetic acid-sodium acetate buffer solution is 4.6, and a content of the sodium chlorite in the solution A is in a range of 1 wt % to 1.5 wt %.

3. The preparation method according to claim 1, wherein in the step 2, the wood is one selected from the group consisting of *Ochroma pyramidale, Populus simonii, Pinus, Betula platyphylla, Zelkova schneideriana, Quercus, Tilia tuan, Ulmus rubra, Mesua ferrea, Fraxinus mandshurica, Paulownia, Cinnamomum camphora, Hevea Brasiliensis, Xylosma congesta, Cupressus funebris*, and *Cunninghamia lanceolata*.

4. The preparation method according to claim 1, wherein in the step 2, the delignification treatment comprises: soaking the wood chip cut from the wood in the solution A, then stirring the solution A soaked with the wood chip at a speed of 500 revolutions per minute (r/min), and then heating the solution A soaked with the wood chip to a temperature of 80 degrees Celsius (° C.) to stew for 6 h.

5. The preparation method according to claim 1, wherein in the step 4, the azobenzene compound is one selected from the group consisting of azobenzene, azoxybenzene, p-aminoazobenzene, 4-methoxyazobenzene, azobenzene-3,3'-dicarboxylic acid, azobenzene-4,4'-dicarboxylic acid, 4-aminoazobenzene-4'-sulfonic acid sodium salt, 3,3'-dimethylazobenzene, 4-phenylazobenzenesulfonyl chloride, 4-dimethylamino-2-methylazobenzene, 4-nitroazobenzene, 4-phenylazobenzoyl chloride, 4,4'-diaminoazobenzene, 4'-chloro-4-dimethylaminoazobenzene, 4-carboxyl-2-aminoazobenzene, azobenzene-4,4'-dicarboxylic acid dimethyl ester, 2,2'-dihydroxyazobenzene, 4-phenyldiazenylaniline hydrochloride, 4-(methylamino) azobenzene, 4-benzyloxyazobenzene, 2'-chloro-4-dimethylaminoazobenzene, 4,4'-azodibenzoyl dichloride, sodium 4-hydroxyazobenzene-4'-sulfonate hydrate, 3'-chloro-4-dimethylaminoazobenzene, 4,4'-di-n-amyloxyazoxybenzene, 4'-iodo-4-dimethylaminoazobenzene, 4-dimethylamino-2-methylazobenzene, 4-dimethylaminoazobenzene-4'-carboxylic acid, 4,4'-bis (maleoylamino) azobenzene, 4,4'-dinonyloxyazoxybenzene, 4,4'-bis(hexyloxy)-3-methylazobenzene, 4,4'-bis(decyloxy)-3-methylazobenzene, 4-hydroxy-azobenzene-4'-carboxylicacid, diethyl azoxybenzene-4,4'-dicarboxylate, 4-acetamido-2',3-dimethylazobenzene, 4-(4-hydroxy-phenylazo) benzoic acid ethyl ester, 2-amino-5-((4-sulfophenyl) azo)-benzene sulfonicacidisodium salt, 4,4'-di-n-dodecyloxyazoxybenzene, 4,4'-bis(dodecyloxy)-3-methylazobenzene, 4-dimethylaminoazobenzene-4-sulfonyl chloride, 2,4-hexadiyne-1,6-diol bis(azobenzene-4-sulfonate), 4-(4-isothiocyanatophenylazo)-N,N-dimethylaniline, 4-[bis(9,9-dimethylfluoren-2-yl)amino]azobenzene, dabsyl-l-leucine, 5-sulfo-4'-diethylamino-2,2'-dihydroxyazobenzene, N,N-diethyl-4-phenyldiazenylaniline, 4-hydroxy-4'-dimethylaminoazobenzene, 4,4'-di-n-octyloxyazoxybenzene, 4-amino-2',3-dimethylazobenzene hydrochloride, 4-(dimethylamino) azobenzene, 2-methyl-5-(p-tolyldiazenyl) aniline, 4-(phenylazo)benzoic acid, 4,4'-azoxydianisole, 4-(4-bromophenylazo) phenol, 4-(4-nitrophenylazo) phenol, 3-[[4-(dimethylamino)phenyl]diazenyl] benzoic acid, dabsyl-1-alanine, 4-(4-butylphenylazo) phenol, 4-(dimethylamino) azobenzene, methyl red hydrochloride, sudan orange G, diethyl 4,4'-azodibenzoate, sodium 2-[4-(dimethylamino)phenylazo]benzoate, 4-[4-(dimethylamino)phenylazo]benzoic acid N-succinimidyl ester, and oxalazine sodium.

* * * * *